United States Patent [19]

Lee, III et al.

[11] Patent Number: 4,896,137
[45] Date of Patent: Jan. 23, 1990

[54] REAR WINDOW STOP-N-TURN SIGNAL INDICATOR LIGHT CIRCUIT

[76] Inventors: Robert Lee, III, P.O. Box 476, Clayton, La. 71326; George Spector, 233 Broadway, Rm. 3815, New York, N.Y. 10007

[21] Appl. No.: 231,254

[22] Filed: Aug. 11, 1988

[51] Int. Cl.⁴ .................................................. B60Q 1/46
[52] U.S. Cl. .................................... 340/479; 340/464; 307/10.8
[58] Field of Search .................. 340/66, 67, 69, 70, 340/71, 72, 73, 74, 81 R, 84, 464, 479; 361/61, 80; 307/10 LS

[56] References Cited

U.S. PATENT DOCUMENTS

| | | | |
|---|---|---|---|
| 4,682,146 | 7/1987 | Friedman | 340/67 |
| 4,734,675 | 3/1988 | Wen | 340/71 |
| 4,736,280 | 4/1988 | Simidian | 362/80 |

*Primary Examiner*—Herbert Goldstein
*Assistant Examiner*—Jeffery A. Hofsass

[57] ABSTRACT

A stop and turn signal system is provided for an auxiliary lamp mounted behind a rear window of a motor vehicle. The system consists of a logic circuit for converting the auxiliary lamp from a stop light to a stop and turn signal indicating light that will prevent some accidents.

4 Claims, 1 Drawing Sheet

REAR WINDOW STOP-N-TURN SIGNAL INDICATOR LIGHT CIRCUIT

BACKGROUND OF THE INVENTION

The instant invention relates generally to automobile indicators and more specifically it relates to a stop and turn signal system for an auxiliary lamp mounted behind a rear window of a motor vehicle.

Numerous automobile indicators have been provided in prior art that are adapted to be mounted behind the rear windows for displaying turn signals to traffic approaching from the rear thereof. For example, U.S. Pat. Nos. 2,084,252; 2,506,330 and 4,626,967 all are illustrative of such prior art. While these units may be suitable for the particular purpose to which they address, they would not be as suitable for the purposes of the present invention as heretofore described.

SUMMARY OF THE INVENTION

There have been many near misses, rear-end and sidelick motor vehicle accidents occurring over the years while a turn was in process. Some of the accidents may have occured mainly because the oncoming driver in the rear may have given little or no attention to the turn signal and the slowing down of the preceding motor vehicle. For instance: If a driver was approaching a turn with the turn signal on and at the same time slowing down, the driver in the rear may not notice the turn signal or the slowing down process and will continue at the same speed. But when the driver making the turn applys the brakes, the driver in the rear may be too close and coming too fast to safely stop or slow down enough to avoid a near miss or an accident.

A primary object of the present invention is to provide a stop and turn signal system for an auxiliary lamp mounted behind a rear window of a motor vehicle that will overcome the shortcomings of the prior art devices.

Another object is to provide a stop and turn signal system for an auxiliary lamp mounted behind a rear window of a motor vehicle which will convert the auxiliary lamp from a stop light to a stop and turn signal indicating light that will prevent some accidents.

An additional object is to provide a stop and turn signal system for an auxiliary lamp mounted behind a rear window of a motor vehicle which will cause the auxiliary lamp to flash red during a turn drawing more attention from the driver in the rear approaching motor vehicle thus warning in advance the actions of the front motor vehicle.

A further object is to provide a stop and turn signal system for an auxiliary lamp mounted behind a rear window of a motor vehicle that is simple and easy to use.

A still further object is to provide a stop and turn signal system for an auxiliary lamp mounted behind a rear window of a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
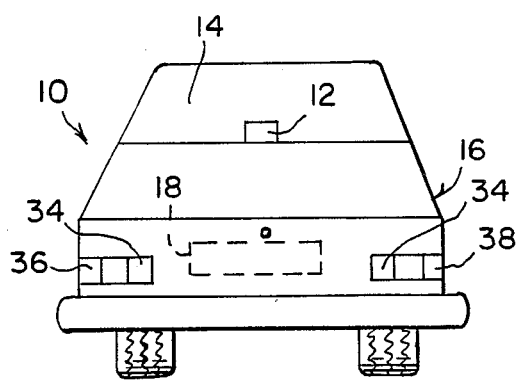
FIG. 1 is a rear view of a motor vehicle with invention installed therein.

Turning now descriptively to the drawings, in which similar reference characters denote similar elements throughout the several views, FIG. 1 illustrates a stop and turn signal system 10 for an auxiliary lamp 12 mounted behind a rear window 14 of a motor vehicle 16. The system 10 consists of a logic circuit 18 for converting the auxiliary lamp 12 form a stop light to a stop and turn signal indicating light that will prevent some accidents.

Figure 2:
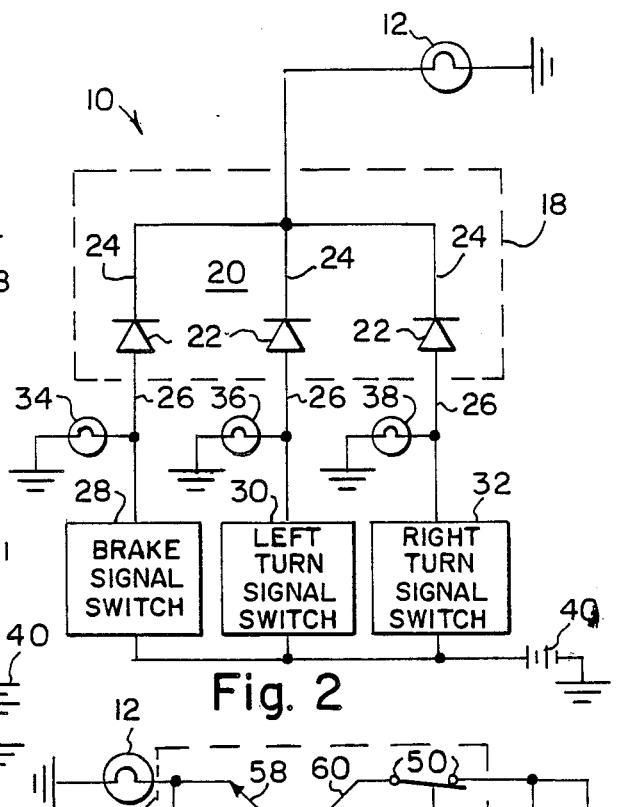
FIG. 2 is a schematic view of a first form of the invention.

The logic circuit 18 shown in FIG. 2, is an OR GATE 20 that has three diodes 22 with their cathode leads 24 all tied together and connected to the auxiliary lamp 12. The diodes anode leads 26 are each connected separately to a brake signal switch 28, a left turn signal switch 30 and a right turn signal switch 32. When the brake signal switch 28, the left turn signal switch 30 or the right turn signal switch 32 is activated it will energize its respective bulb 34, 36 or 38 and forward bias the respective diode 22 in which current will flow through the auxiliary lamp 12 from a battery 40, making the auxiliary lamp 12 light up.

Figure 3:
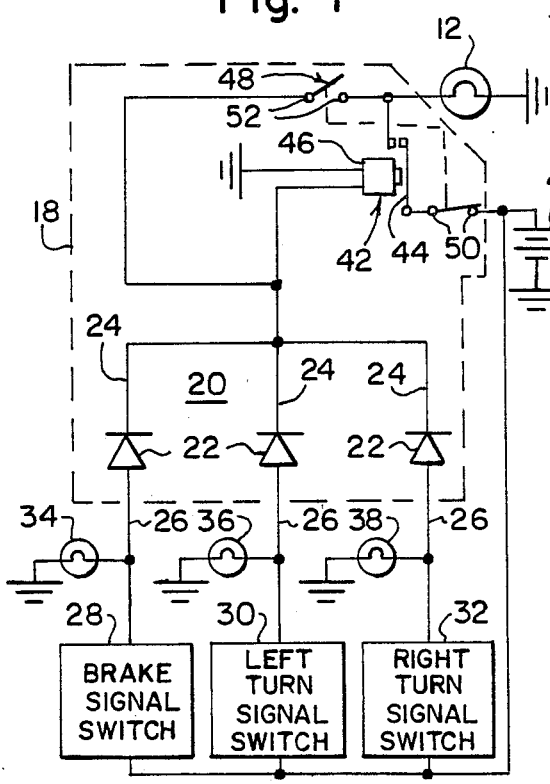
FIG. 3 is a schematic view of a second form of the invention utilizing a relay within the logic circuit to operate the auxiliary lamp as the stop and turn signal indicating light.

FIG. 3 shows a second form of the invention in which the logic circuit 18 contains a relay 42 therein. The relay 42 has a moveable contact 44 and a coil 46. The moveable contact 44 is disposed between the battery 40 and the auxiliary lamp while the cathode leads 24 which are all tied together are now connected to the coil 46 of the relay 42. When the brake signal switch 28, the left turn signal switch 30 or the right turn signal switch 32 is activated it will energize its respective bulb 34, 36 or 38 and forward biase the respective diode 22 in which current will flow through the coil 46 of the relay 42 from the battery 40 closing the moveable contact 44 in which current will flow through the auxiliary lamp 12 from the battery 40, making the auxiliary lamp 12 light up.

A double pole, single throw switch 48 is also provided having one set of terminals 50 between the moveable contact 44 of the relay 42 and the battery 40 and another set of terminals 52 disposed between the cathode leads 24 of the OR GATE 20 and the auxiliary lamp 12. The switch 48 can be moved into one position to by-pass the relay 42. The switch 48 can be moved into another position to allow the relay 42 to function.

Figure 4:
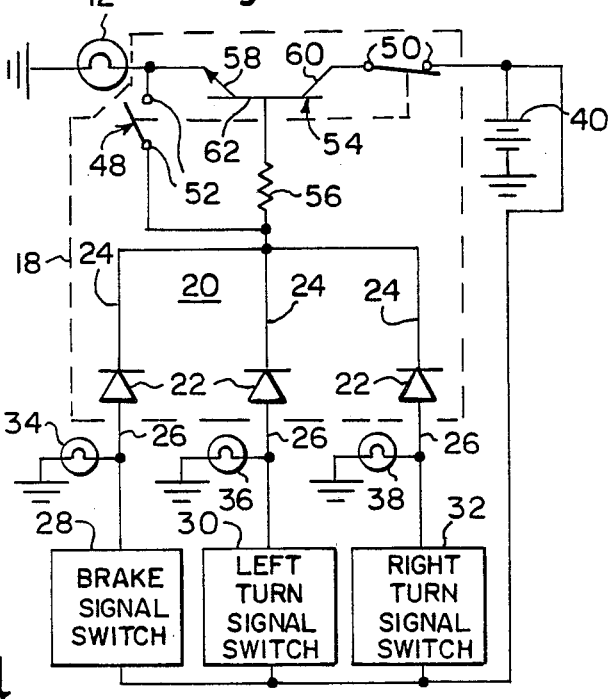
FIG. 4 is a schematic view of a third form of the invention utilizing a transistor to operate the auxiliary lamp as the stop and turn signal indicating light.

FIG. 4 shows a third form of the invention in which the logic circuit 18 contains an NPN transistor 54 and a resistor 56 in place of the relay 42. The transistor 54 has an emitter 58, a collector 60 and a base 62. The collector 60 is connected to the battery 40 while the emitter is connected to the auxiliary lamp 12. The resistor 56 has one end connected to the base 62 of the transistor 54 while the cathode leads 24 which are all tied together are now connected to other end of the resistor 56. When the brake signal switch 28, the left turn signal switch 30 or the right turn signal switch is activated it will energize its respective bulb 34, 36 or 38 and forward bias the respective diode 22 in which current will flow through the resistor 56 and the transistor 54 in which current will then flow through the auxiliary lamp 12 from the battery 40, making the auxiliary lamp 12 light up.

The double pole, single throw switch 48 has one set of terminals 50 disposed between the collector 60 of the transistor 54 and the battery 40. The other set of terminals 52 is disposed between the cathode leads 24 of the OR GATE 20 and the auxiliary lamp 12. The switch 48 can be moved into one position to by-pass the transistor 54 and the resistor 56. The switch 48 can be moved into another position to allow the transistor 54 and the resistor 56 to function.

Figure 5:
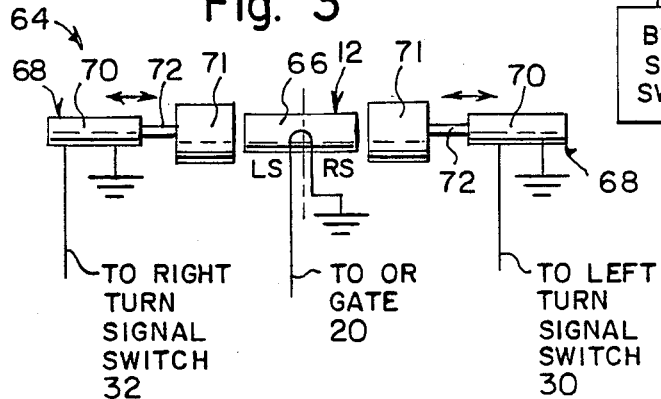
FIG. 5 is a partial schematic view of a structure to indicate on the auxiliary lamp the left turn signal and the right turn signal when the lamp is flashing.

FIG. 5 shows an assembly of components 64 whereby the auxiliary lamp 12 will indicate a left turn signal or a right turn signal when the auxiliary lamp 12 is flashing. The assembly 64 includes an elongated housing 66 provided to have the auxiliary lamp 12, a pair of solenoids 68 each having a coil 70 and a moveable core 72 and a pair of sleeves 71. One of the solenoids 68 is positioned to left of the housing 66 with its respective coil 70 electrically connected to the right turn signal switch 32 and its respective moveable core 72 extending towards the housing 66. Other of the solenoids 68 is positioned to right of the housing 66 with its respective coil 70 electrically connected to the left turn signal switch 30 and its respective moveable core 72 extending towards the housing 66.

Each sleeve 71 is affixed onto a distal end of the moveable core 72 of one of the solenoids 68. When the coil of the left solenoid 68 is activated by the right turn signal switch 32, its respective moveable core 72 will extend allowing the respective sleeve 71 to cover left portion of the housing 66 to indicate a right turn. When the coil 70 of the right solenoid 68 is activated by the left turn signal switch, its respective moveable core 72 will extend allowing the respective sleeve 71 to cover right portion of the housing 66 to indicate a left turn.

When a driver presses the brake pedal, the auxiliary lamp 12 comes on as a solid red light, along with the brake light bulb 34. If the brake pedal is released, the auxiliary lamp 12 goes out with the brake light bulb 34.

If the left or right turn signal light bulb 36 or 38 is flashing, the auxiliary lamp 12 flashes also, indicating a turn. But if the driver presses on the brake pedal, the auxiliary lamp 12 reverses to a solid red brake light. When the brake pedal is released, the auxiliary lamp 12 reverses back to flashing, with the turn signal, if the signal is not cancelled.

This alternating exchange will go on as long as a turn signal is flashing and the brake pedal is pressed and released. But the brake will over-ride the turn signal indications in the auxiliary lamp 12. The system 10 will work on any negative ground vehicle with a combined or separate brake and turn signal circuit. The logic circuit 20 can replace the logic circuit of any other auxiliary lamp stop light, converting it to a stop and turn signal indicator light.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A stop and turn signal system for an auxiliary lamp mounted inside a rear window of a motor vehicle, said system comprising a means for converting the auxiliary lamp from a stop light to a stop and turn signal indicating light that will prevent some accidents wherein said converting means is a logic circuit comprising:
    (a) a relay having moveable contact and a coil, the moveable contact being disposed between a battery and the auxiliary lamp;
    (b) an OR GATE having three diodes with their cathode leads all tied together and connected to the coil of said relay, said diodes anode leads are each connected separately to a brake signal switch, a left turn signal switch and a right turn signal switch, whereby when the brake signal switch, the left turn signal switch or the right turn signal switch is activated, it will energize its respective bulb and forward bias said respective diode in which current will flow through the coil of said relay from the battery closing the moveable contact in which current will flow through the auxiliary lamp from the battery, making the auxiliary lamp light up; and
    (c) a double pole, single throw switch having one set of terminals disposed between the moveable contact of said relay and the battery and another set of terminals disposed between the cathode leads of said OR GATE and the auxiliary lamp so that said switch can be moved into one position to by-pass said relay and said switch can be moved into another position to allow said relay to function.

2. A stop and turn signal system for an auxiliary lamp mounted inside a rear window of a motor vehicle, said system comprising a means for converting the auxiliary lamp from a stop light to a stop and turn signal indicating light that will prevent some accidents, wherein said converting means is a logic circuit comprising:
    (a) an NPN transistor having an emitter, a collector and a base, the collector is connected to a battery while the emitter is connected to the auxiliary lamp;
    (b) a resistor having one end connected to the base of said transistor;
    (c) an OR GATE having three diodes with their cathode leads all tied together and connected to the end of said resistor, said diodes anode leads are each connected separately to a brake signal switch, a left turn signal switch and a right turn signal switch, whereby when the brake signal switch, the left turn signal switch or the right turn signal switch is activated, it will energize the respective bulb and forward bias said respective diode in which current will flow through said resistor and said transistor in which current will then flow through the auxiliary lamp from the battery, making the auxiliary lamp light up; and
    (d) a double pole, single throw switch having one set of terminals disposed between the collector of said transistor and the battery and other set of terminals disposed between the cathode leads of said OR GATE and the auxiliary lamp so that said switch can be moved into one position to by-pass said transistor and said resistor and said switch can be moved into another position to allow said transistor and said resistor to function.

3. A stop and turn signal system for an auxiliary lamp mounted inside a rear window of a motor vehicle, said system comprising a means for converting the auxiliary lamp from a stop light to a stop and turn signal light for preventing accidents, wherein said converting means comprises a logic circuit being an OR GATE having three diodes with their cathode leads all tied together and connected to the auxiliary lamp, said diodes anode leads are each connected separately to a brake signal switch, a left turn signal switch and a right turn signal switch, whereby when the brake signal switch, the left turn signal switch or the right turn signal switch is activated, it will energize its respective bulb and forward bias said respective diode in which current will flow through the auxiliary lamp from a battery, making the auxiliary lamp light up, further comprising a means for indicating on the auxiliary lamp a left turn signal or a right turn signal when the auxiliary lamp is flashing.

4. A stop and turn signal system as recited in claim 3, wherein said indicating means includes:
  (a) an elongated housing provided to house said auxiliary lamp;
  (b) a pair of solenoids, each having a coil and a moveable core in which one of said solenoids is positioned to left of said housing with its respective coil electrically connected to the right turn signal switch and its respective moveable core extending towards said housing, while other of said solenoids is positioned to right of said housing with its respective coil electrically connected to the left turn signal switch and its respective moveable core extending towards said housing; and
  (c) a pair of sleeves, each affixed onto a distal end of the moveable core of one of said solenoids so that when the coil of said left solenoid is activated by the right turn.

* * * * *